July 1, 1930. F. D. HOLDSWORTH 1,768,840
VALVE
Filed March 2, 1916 2 Sheets-Sheet 1
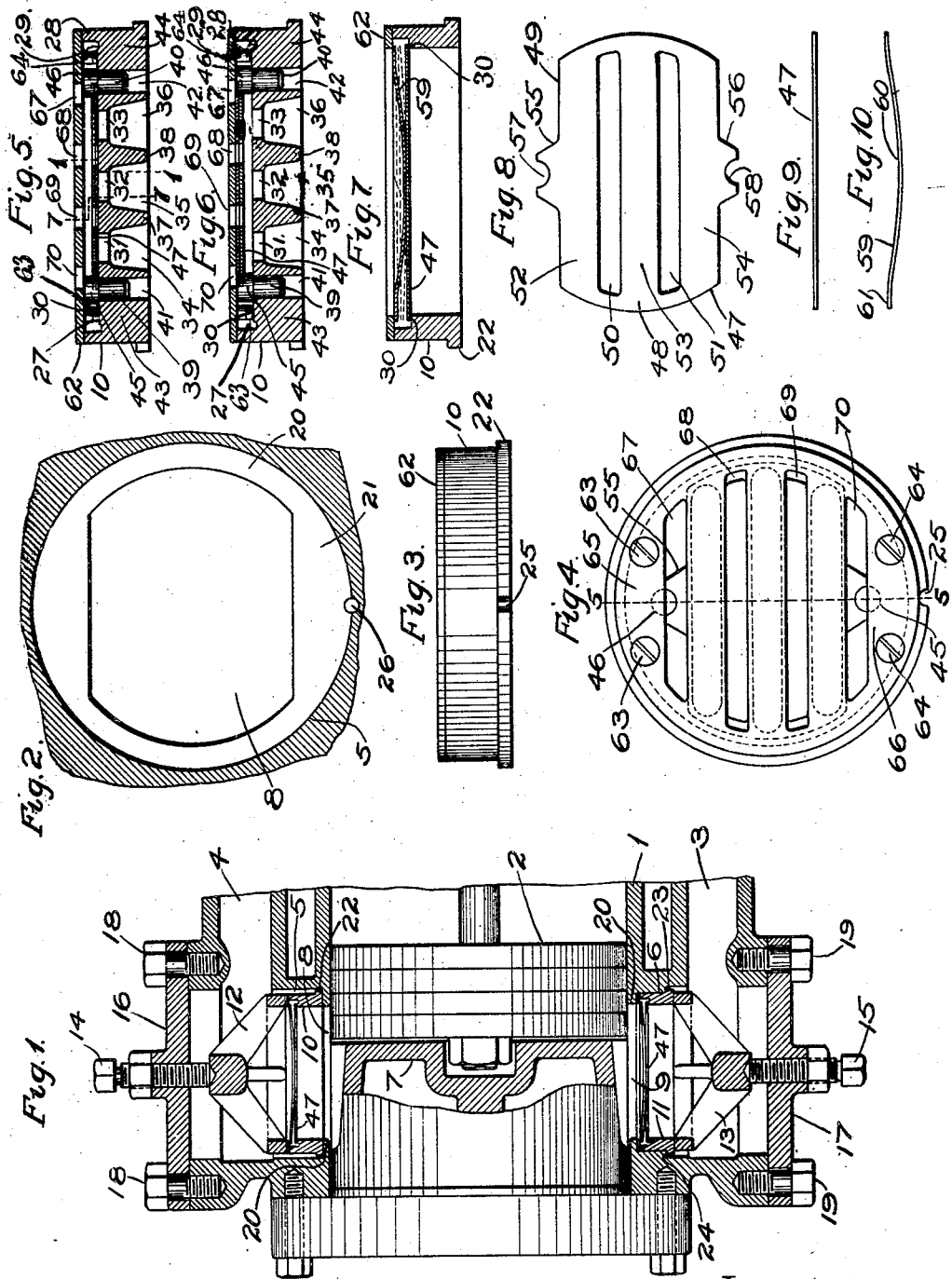
Inventor
Fred D. Holdsworth
By
Atty.

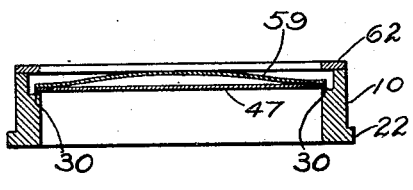
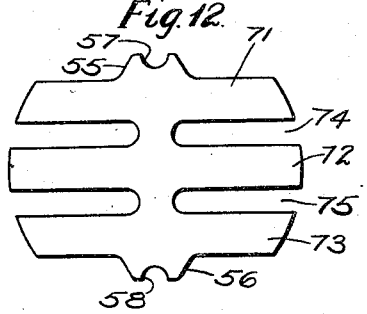
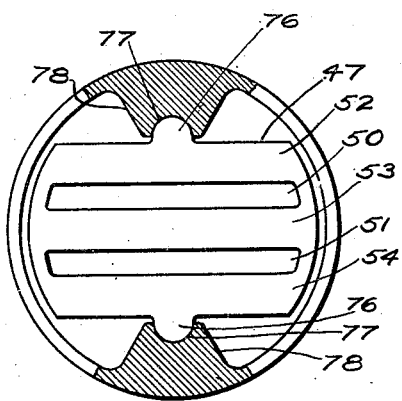
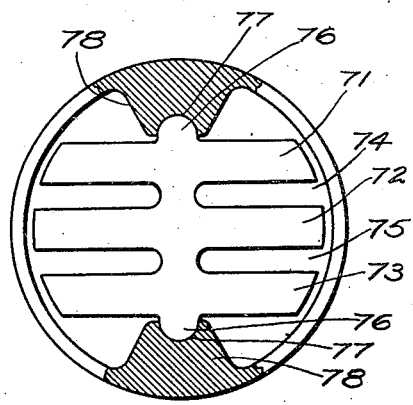
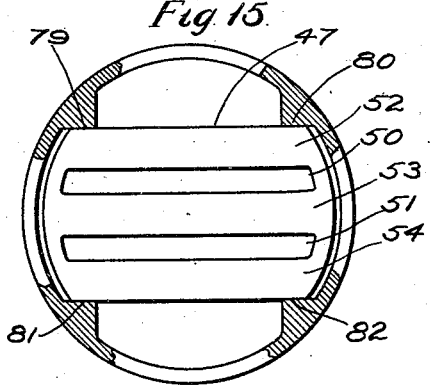
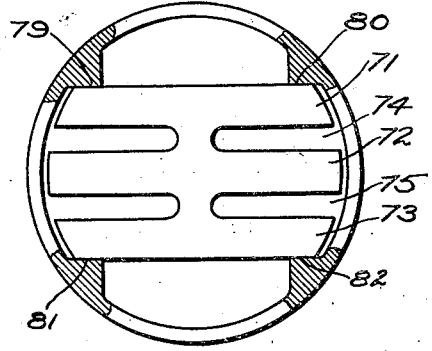

Patented July 1, 1930

1,768,840

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE

Application filed March 2, 1916. Serial No. 81,727.

My invention relates to valves, and more especially to valves of the flexible type commonly known as plate valves.

It has among its objects to provide an improved valve of the type mentioned having greatly increased area. A further object of my invention is to provide an improved plate valve having improved wearing qualities. A still further and more specific object of my invention is to provide a plate valve of an improved and simplified construction which is especially adapted to use in connection with compressors, the same being of large area, readily inserted or removed, and of such a construction that no parts may become separated from the valve and enter the cylinder. These and other objects of my invention will hereinafter appear.

In the accompanying drawings, I have, for purpose of illustration, shown several embodiments which my invention may assume in practice, the latter being illustrated as applied to a compressor, although it is to be understood that it is not limited to use in such a machine and may be used in widely different relations.

In these drawings,—

Figure 1 is a partial vertical sectional view of the compressor cylinder equipped with intake and discharge valves of my improved construction, certain parts being broken away to facilitate illustration, and the view of the valve members being taken on line 1—1 of Figure 5.

Figure 2 is an enlarged plan view of one of the valve sockets, the cylinder and head being broken away to facilitate illustration.

Figure 3 is a side elevation of a valve cage receivable in the socket shown in Figure 2.

Figure 4 is a plan view of the cage shown in Figure 3, the parts contained therein being indicated in dotted lines.

Figure 5 is a sectional view taken on line 5—5 of Figure 4, showing the valve member in closed position.

Figure 6 is a similar sectional view showing the valve member in open position.

Figure 7 is a detail view showing the valve member and its spring in a plurality of positions, the view being taken on line 7—7 of Figure 5 and certain parts of the cage being omitted to facilitate illustration.

Figure 8 is a detail plan view of one form of valve member, the same also sufficing as a detail plan view of the valve spring.

Figure 9 is an end view of the valve member shown in Figure 8.

Figure 10 is an end view of the valve spring.

Figure 11 is a view similar to Figure 7, showing a modified form of spring used in connection with the valve member.

Figure 12 is a plan view of a modified form of valve member.

Figure 13 is a plan view of a modified form of connection between the valve and the cage, a portion of the latter being broken away to facilitate illustration.

Figure 14 is a view similar to Figure 13, showing a further modified form of valve member.

Figure 15 is a view similar to Figure 13, showing a still further modified form of valve member and mounting therefor.

Figure 16 is a view similar to Figure 13, showing a still further modified form of valve member and mounting therefor.

The compressor shown is of a standard type comprising a cylinder 1 having a piston 2 reciprocable therein to draw air into the cylinder from an inlet 3 and discharge air under pressure from the cylinder into an outlet 4, suitable sockets 5 and 6 being provided on opposite sides of the head 7 adjacent inlet and outlet openings 9 and 8, to receive containers or cages 10 and 11 containing my improved valves, hereinafter described, the cages 10 and 11 being clamped in their sockets and over these openings by suitable clamps 12 and 13 and setscrews 14 and 15, the latter of which are mounted in cover plates 16 and 17, bolted to the cylinder casing by suitable bolts 18 and 19.

It will be noted that in my improved construction, as shown in Figure 2, each of the valve sockets 5 and 6 is provided with a plurality of ledges 20 and 21 cooperating to form the openings 8 and 9 mentioned above, and that these openings have rounded ends and straight sides, the ledges 21 on opposite sides of the same acting to cut off chord-like portions from the otherwise circular openings. In each of these sockets 5 and 6, a valve carrying element or cage is seated, these cages being disposed one above the other, as shown, and the cage 11 having flanges 23 thereon engageable with an annular shoulder 24, and the cage 10 having a shoulder-like ledge 22 that serves to center it on the ledge 20. It will also be noted that in order to insure the cages being properly placed in the sockets, each of these flanges 22 and 23 is provided with a notch 25 adapted to receive a pin 26 carried in the socket.

These valve carrying elements or cages 10 and 11 are of identical construction so that a description of the cage 10 will suffice for both. As shown, this cage is provided with a central circular recess 27 on its upper surface forming an annular upstanding wall 28 extending around the edge of the same. In the bottom of this recess an annular groove 29 is provided in order to form a readily machined annular seat 30. The bottom of this recess is also provided with a series of parallel slots 31, 32, and 33 of different lengths, cooperating to form a ported valve seat, each slot having its opposite ends laid in the paths of arcs struck from the same center. Communicating with these slots 31, 32, and 33, are orifices or openings 34, 35, and 36, respectively, formed in the under side of the cage, which orifices are in turn spaced apart by gridlike members 37 and 38. It will also be noted that suitable pins 39 and 40 are seated in vertically disposed recesses or openings 41 and 42, provided in ledge-like portions 43 and 44 formed on the cage and similar in shape to the ledges 21, these pins being provided with enlarged cylindrical upper ends 45 and 46 in order to retain them in the openings 41 and 42.

Carried on the bottom of the recess 27, is a valve member 47 preferably of the plate type and formed from a sheet of suitable flexible material, preferably sheet steel. In the form of my invention illustrated in Figures 1 to 10, this valve member is of the shape shown in detail plan in Figure 8, preferably being provided with rounded paddle-like ends 48, adapted normally to rest on the seat 30, and straight sides 49, so that it conforms to the slotted surfaces of the recess 27 in the cage. As shown in that figure, this valve member is also of the multiple valve type and provided with a pair of parallel slots 50 and 51 (having their ends shaped similarly to the ends of the slots 31, 32, and 33), normally adapted to overlie the gridlike members 37 and 38, while the remaining striplike portions or spaced elements of the valve, 52, 53, and 54, overlie the slots 31, 32, and 33. As shown, the straight sides 49 of this valve member are also provided with centrally located lateral projections 55 and 56 having notches 57 and 58 therein adapted to receive and move vertically along the portions 45 and 46 on the pins 39 and 40.

Cooperating with this valve member 47, is preferably a spring member which may assume various forms, but preferably is of the same form as the valve and may likewise be considered as shown in plan in Figure 8, the spring having the same outline, slots, striplike portions or elements, and notched pin-engaging portions as the valve member 47 shown in that figure, and having these parts of the same size so that they are adapted to coincide with the same parts on the valve member. It will be noted, however, that as shown in side elevation in Figure 10, this spring 59 is preferably normally bowed at its center at 60 to give it the desired resiliency, and that it is preferably though not necessarily, also provided with slightly flattened or bent up end portions 61 to eliminate wear at its ends and to provide ample transverse bearing surface to keep the valve parallel with the valve seat.

Extending over the spring 59, with its under surface normally engageable with the flattened ends 61 thereof, and preferably operating to hold both this spring and the valve 47 within the valve cage and cooperating therewith to form a unitary structure, is a circular retaining cover member or abutment 62. This member, as shown, preferably assumes the form of a plate which rests upon the upper edge of the annular wall 28 on the cage, and is attached to the latter by a plurality of sets of screws 63 and 64 which extend vertically downward through ledge members 65 and 66, formed on the plate, and are suitably threaded into the ledge portions 43 and 44. It will also be noted that the edges of these ledge members 65 and 66 partially overlie the upper ends of the pins 39 and 40 so that these pins are effectually held in place. As illustrated, this plate 62 is also provided with a series of slots 67, 68, 69, and 70 disposed parallel to each other and having their ends shaped similarly to the ends of the slots 50 and 51 of the valve and spring, with which the center slots 68 and 69 register.

When it is desired to place the cage 10 and its enclosed valve in its socket, the flange portion 22 of the cage is seated upon the ledges or flanges 20 and 21 surrounding the opening 8, with the notch 25 receiving the projection or pin 26. Then the cage is clamped in place. The valve 47 and spring 59 normally occupy the position shown in Figure 5. In this position, it will be noted that the slots or ports 31, 32, and 33 are tightly closed, the spring holding the valve down over the same. As air is compressed by the piston, however, and forced out thereby through the opening 8 in the cylinder, it strikes the valve member 47 and opens the same, a light pressure acting to elevate only the outer ends thereof to the positions shown in dotted lines in Figure 7, while a heavier pressure acts to elevate the ends and the valve center successively, until both valve and spring occupy the upper position shown in Figure 7, wherein the ports or openings 31, 32, and 33 are entirely unobstructed throughout their length, and the air is free to pass through these ports and the slots 67, 68, 69, and 70, (Figure 6) to the outlet 4 (Figure 1). It will thus be seen that the spring is flattened against the cover and so is disposable in a plane parallel to the plane of the valve. It will further be noted that due to the bending of the valve before its complete separation from the seat, it assumes a form somewhat similar to that of the spring, and that as it lifts, the valve and the spring both flatten, whereby they simultaneously tend to become parallel to the valve casing. As the pressure decreases on the return stroke of the piston, the spring 59 will, of course, act automatically to reseat the valve member 47, the parts then returning to the positions shown in Figure 5. Obviously, whenever it is desired to remove the valve, the entire cage may be readily removed upon simply unclamping the same.

It will be noted that in my improved construction, the entire surface of the valve member is movable away from the seat, so that the entire area of the ports beneath the valve is clear of obstruction, and air to the full capacity of these ports may pass through the same. It will also be noted that the valve member is extremely sensitive, the end portions of the same being free to move upward under slight pressure to partially open the ports. It should also be noted that the valve member itself is of such construction that it is not liable to breakage, and is so mounted and movable that this liability is further decreased. Attention should also be directed to the fact that even should the valve member break, there would even then be little likelihood of the same finding its way into the cylinder, due to the connected ends of the valve strips. So far as the spring 59 is concerned, it will be noted that the same acts to retard the opening action of a portion of the valve member, and is securely housed between the latter and the upper plate, and of such a construction that it is not liable to breakage. It will also be noted that due to the cooperation of the upper plate 62 and the enlarged portions 45, 46 on the upper ends of the pins 39, 40 above described, the latter are securely locked in position so that they cannot work loose or find their way into the cylinder. It will also be obvious that the screws 63, 64, used for attaching the plate 62 to the cage, are also effectually prevented, in the case of the inlet valve, from finding their way into the cylinder, since the same normally rest upon the ledges 21 formed on the valve socket and in the case of the discharge valve, the clamp 12 performs the same function. Attention is also directed to the fact that in my improved construction, as shown herein, either valve cage may be inserted in either socket, it being desirable that the cages be interchangeable. Obviously, however, when it is desired to use different cages, as for instance to reduce the clearance at the discharge valve, the construction and location of the cage containing that valve may be modified in such a manner as to reduce the clearance to the amount desired without in any way interfering with the operation of the valve. Due to the shape of the openings in the sockets and the shape of the cage and valve member used herein, it will also be noted that the amount of dead space between the valve and the cylinder is reduced to the minimum at the same time that the entire opening is made available for use.

In Figure 11, I have illustrated in a view similar to Figure 7, a modified form of the construction herein above described, which differs therefrom only in the arrangement of the spring 59, the latter in this instance being inverted from the position shown in Figure 7, so that its ends instead of acting on the bottom of the upper plate 62, normally act on the upper surface of the ends of the valve 47, and its center instead of acting on the center of the valve, normally acts on the center of the under surface of the upper plate. In this form of construction, it will be obvious that the action of the valve member will be reversed, the center of the valve member first moving away from the seat, and the ends later moving away therefrom as the pressure is increased. In Figure 12, I have also illustrated a modified form of valve, preferably adapted to use with a similar spring, the same comprising a body similar to the body shown in Figures 9 and 10, but having a series of spacer fingers 71, 72, and 73 disposed on its opposite sides and spaced apart by open ended slots 74 and 75. In Figure 13, I have illustrated a valve member 47 of the construction shown in Figure 8, but have illustrated a modified form of connection between the same and the valve cage, the valve member being provided with oppositely disposed ears 76 thereon, which are adapted to slide up and down in correspondingly shaped notches 77 formed on projections 78 integral with the cage. In Figure 14, I have also illustrated a valve member of the construction shown in Figure 12 but provided with ears 76 movable in similar notches 77 formed in projections 78 on the valve cage. In Figure 15, I have also illustrated a valve member of the form shown in Figures 8 and 13, but mounted in the valve cage in a modified manner, the valve cage preferably being provided with a plurality of pairs of spaced lugs 79, 80 and 81, 82, on its opposite sides and at each corner of the valve member, which act as guides and retaining means for the latter. In Figure 16, I have illustrated a further modified form of the construction shown in Figure 15, wherein, instead of using a valve member of the construction shown therein, I have illustrated a valve member of the type shown in Figures 12 and 14. It will of course be understood that when these lugs 79, 80, 81, and 82 are provided, it will be unnecessary to provide any ears on the valve members, or any notched portions receiving the same, or to provide the pins illustrated in the form of my invention shown in Figures 1 to 10.

While I have in this application specifically described several embodiments which my invention may assume in practice, it is of course to be understood that these forms of the same are used for purposes of illustration, and that the invention is in nowise limited thereto, the same being capable of being embodied in other forms and adapted to other uses without departing from its spirit.

What I claim as new and desire to secure by Letters Patent is:

1. In a valve mechanism, a ported seat member, a plane cover member substantially coextensive with said seat member, a valve member disposed between the same, a spring disposed between said valve and cover members and compressed on opening movement of said valve member and engaging one of said members at substantially spaced loci and the other at an intermediate locus, the engagement at one of said loci being a line contact and the portion of said spring between said contacts with said member engaged at spaced loci being freely flattenable completely into a plane and approaching a plane condition progressively on opening of said valve member, and means for positioning the valve member and spring in proper working position with respect to each other and to the seat.

2. In a valve, the combination with a plane ported seat member, of a cover substantially coextensive with said seat member, an elongated valve member disposed between the same, a solely transversely flexed, normally bowed resilient valve seating element disposable on opening of said valve member substantially in a plane parallel to the latter and loosely disposed between said valve member and cover in a position overlying the ported portion of said seat member, and means for positioning the valve member and valve seating element in proper working relation with each other and the valve seat.

3. In a valve, the combination with a plane ported seat member, of a cover, an elongated valve member disposed between the same, a solely transversely flexed, normally bowed resilient valve seating element disposable on opening of said valve member substantially in a plane parallel to the latter and loosely disposed between said valve member and cover in a position overlying the ported portion of said seat member, said element engaging one of said members at substantially spaced loci and having its cross section at all points between said loci at least as great as at said loci, and means for positioning the valve member and valve seating element in proper working relation with each other and the valve seat.

4. In a valve, the combination with a plane ported seat member, of a cover, an elongated valve member disposed between the same, and a solely transversely flexed, normally bowed resilient valve seating element disposable on opening of said valve member substantially in a plane parallel to the latter and disposed between said valve member and cover in a position overlying the ported portion of said seat member, said element corresponding in plan substantially in dimensions and outline to the conformation of the valve member and having the central portion of the bow portion thereof not less strong than the extremities of the bow portion thereof.

5. In a valve, a ported seat, a flexible valve member cooperating with said seat, a cover, guiding means for said valve disposed between said cover and said seat, and a flexible spring plate member loosely disposed between said valve and cover and guided by said guiding means and having at all times at least three parallel lines of contact with said members, said spring being so flexed that each element in the surfaces of said spring bears a like angular relation to said lines of contact.

6. In a valve, the combination with a seat having ports therein, and an abutment, of a movable means for closing said ports comprising a plurality of spaced elements, and a resilient means for normally retaining said movable means on said ports comprising a plurality of similarly disposed elements imperforate between the ends of the ports and initially having a line contact only with one of said first named elements but flexible into surface contact therewith.

7. In a valve, the combination with a seat having ports therein, and an abutment, of a movable means for closing said ports and comprising a plurality of spaced elements, and a resilient normally bowed means for normally retaining said movable means on said ports and comprising a plurality of elements each of which is disposable within the contour of one of said spaced elements and is imperforate throughout the length thereof.

8. In a valve, the combination with a valve seat having a longitudinally extending port extending throughout the greater portion of the length thereof, an abutment extending throughout the length of said port, and a valve member disposed between said seat and abutment, of a resilient valve seating plate member, said members being so formed that the valve and its seating member simultaneously approach parallelism during unseating of the valve.

9. In a valve, the combination with a ported seat member, of a ported cover, a ported valve member between the same, and a resilient valve seating element of substantially the same conformation as said valve member engaging one of said members at materially spaced loci and having its portion between said loci freely flattenable completely into a plane.

10. In a valve, the combination with a ported seat, of an elongated valve member, a valve retaining member, a normally bowed resilient unit having engagement with said valve member when the latter is seated and progressively engageable throughout its length with the surface of said valve member as the latter is lifted from its seat, and means for positioning the valve member and bowed unit in proper working position with respect to each other and to the seat.

11. In a valve, the combination with a ported seat, of an elastic valve member having its ends movable bodily away therefrom, a cover plate having flow ports therein, and a spring between said plate and valve member and engaging the latter along a line adjacent the middle part thereof.

12. In a valve, the combination with a ported seat, of an elastic valve member cooperating therewith and having ends movable bodily away therefrom, a ported valve cover plate, and a bowed spring engageable with said valve member and said plate along parallel lines.

13. In a valve, the combination with a ported seat, of an elongated flexible valve member cooperating therewith and movable bodily away therefrom, a cover plate, a purely bowed spring loosely engageable with said valve member and said plate and disposable substantially in a plane parallel to the plane of said valve member, and means for positioning the valve member and spring in proper working position with respect to each other and to the seat.

14. In a valve, the combination with a ported seat, of a valve member cooperating therewith and movable bodily away therefrom, a cover plate, a bowed spring free of both said valve member and said cover plate and having flattened ends and disposed between said valve member and said plate and engageable in substantially complete surface contact with both of the same, and means for positioning said valve member and spring engageable only with the outer edges thereof.

15. In a valve, the combination with a ported seat, of an elastic valve member thereon having bodily movable ends, a ported cover plate, and a spring between said valve member and plate having a bowed portion engageable with a portion of the valve member and its ends engageable with said cover plate.

16. In a valve mechanism, the combination with a valve cage providing a plane seat traversed by at least one long straight narrow port and a ported cover, of a thin normally plane valve member having a portion similar in contour to said port but of slightly greater length and width than said port and movable bodily towards and from said seat, and a single spring similar in contour to said valve member loosely interposed between said valve member and cover and overlying said port, said spring being imperforate as to its portion overlying said port and in the form of a bow, said spring engaging said valve and cover at spaced loci, engaging one of the same adjacent the middle thereof and the other adjacent the opposite ends thereof, the flattening out of the bow of the spring permitting the full necessary bodily opening movement of the valve.

17. In a valve, the combination with a ported seat, of an elastic valve member having its opposite portions adapted to be flexed bodily away from said seat by a light fluid pressure and its body portion flexed bodily away therefrom upon an increase in pressure.

18. In a valve, the combination of a valve-carrying element having a ported seat, a bodily movable valve member having elongated oppositely extending portions, a stationary ported cover plate having ports offset with respect to the ports in said seat, and a plate spring interposed between said valve member and said plate and engageable therewith.

19. In a valve, the combination of a valve supporting element having a ported seat, a ported cover plate having ports therein out of alinement with the ports in said ported seat, an elastic valve member having elongated oppositely extending portions and a port registering with a port in said plate, and a plate spring interposed between said valve member and plate and engageable therewith.

20. In a valve, the combination of a valve container having a ported seat, an elastic valve member having a port therein out of alinement with the ports in said ported seat, a cover plate having a port registering with the port in said valve member, and a ported spring between said plate and valve member having ports registering with the ports therein.

21. In a valve, the combination of a valve container having an elongated ported seat and valve guides at opposite sides of said seat, and an elongated ported elastic valve member having a plurality of slotted relatively flexible ends and movable bodily toward or from said seat and having portions engageable with said guides.

22. In a valve, the combination of a valve-carrying element having a ported seat and valve guides at each side of said seat, an elastic valve member movable bodily toward or from said seat and having portions engageable with said guides, and a spring engageable with said valve member and said guides and free for lateral movement save for said guides normally retaining the valve member upon said seat.

23. In a valve, the combination of a valve-carrying element having a ported seat and valve guides at opposite sides of said seat, a ported elastic valve member movable bodily toward or from said seat and engageable with said guides, and a ported valve spring normally retaining said valve member on said seat.

24. In a valve, the combination of a valve container having a ported seat, valve guiding means on said container on opposite sides of said seat, a ported valve member extending over the ports in said seat and guided by said means, a ported valve spring engageable with said valve member and guided by said means, and a ported cover plate having ports registering with the ports in said valve member and spring.

25. In a valve, the combination of a valve container having a ported seat and a recess therein, a pin carried in said recess having an enlarged portion disposed adjacent said seat, a ported valve member slidable along the enlarged portion of said pin, a ported spring member likewise slidable along said pin, and a plate carried by said container and engageable by said spring having ports registering with the ports in the latter and a portion overlying said pin.

26. In a valve, the combination of a valve containing cage having a flanged portion thereon, a cage socket having an opening therein and a cooperating flange portion underlying the flange on said cage, means for holding said cage in said socket, and cooperating means, independent of said holding means, on said cage and socket for insuring a predetermined location of said cage in said socket.

27. In a valve, the combination of a valve socket having an elongated opening therein and a flange at each side of said opening, a valve-carrying element seated in said opening and resting upon said flanges having ports disposed over said opening, and an elongated flexible valve member carried by said element and disposed over the ports in the latter.

28. In a valve, the combination of a valve-carrying element having a ported seat, a flexible ported valve member normally covering the ports therein, a ported spring engageable with said valve member and having a bowed portion between its ends and relatively straight ends, and a ported spring-retaining plate engageable thereby and carried by said valve-carrying element.

29. In a valve, a ported valve seat, a valve disposed over the ports thereof, a guard, and a transversely flexed spring having the same contour as said valve and contacting with said valve and with said guard at all times at least along parallel lines.

30. In a valve, a ported valve seat, a valve disposed over the ports thereof, a cover, and a transversely flexed spring having the same contour as said valve and contacting with said valve and with said cover at all times at least along straight lines, the contact with one of said last mentioned members being a stationary contact and that with the other thereof being a sliding contact.

31. In a valve, a valve seat provided with an elongated straight port, a cover, a valve overlying said port, and a transversely flexed spring constituting the sole valve closing means and disposed between said valve and cover with its axis of flexion parallel to the shorter axis of said port, said spring being imperforate in the central longitudinal line of said port.

32. In a valve, a valve seat provided with parallel ports, a cover, a valve having a plurality of portions each overlying one of said ports, and a transversely flexed spring disposed between said valve and cover with its axis of flexion transverse to said ports.

33. In a valve, a valve seat provided with parallel ports, a cover, a valve having a plurality of portions each overlying one of said ports and connected at their ends, and a transversely flexed spring disposed between said valve and cover with the axis of flexion transverse to said ports.

34. In a valve, a valve seat provided with parallel elongated ports, a cover for said valve having ports parallel to but out of alinement with the ports in said seat, a valve disposed on said seat and having portions overlying said ports and openings in alinement with the ports in the cover and having said port covering portions joined together by a transverse portion, and a spring transversely flexed about an axis parallel to said transverse portion and disposed between said valve and cover.

35. In a valve mechanism, a valve seat provided with a straight port slot, a valve cooperating therewith, a guard disposed opposite said port slot, and a transversely flexed valve seating spring contacting with said valve, with a contact permitting sliding therebetween, along a line whose projection on the valve seat will fall within the limits of said port slot.

36. In combination, a valve seat having a longitudinally extending port formed therein, a valve of flexible material overlying said port, and means cooperating with said valve and permitting the ends of said valve on opening of the latter to move freely away from said seat and engaging said valve adjacent its center whereby said central portion opposes a greater but overcomable resistance to movement from the seat.

37. In combination, a valve seat having a longitudinally extending port formed therein, a flexible valve cooperating with said seat, and means cooperating with said valve and permitting the longitudinal central portion thereof to move out of contact with said seat when said valve opens while permitting the ends of said valve to bend about said central portion in the manner of a centrally supported uniformly loaded beam.

38. In a valve mechanism, the combination with a valve cage comprising a seat having an elongated port therein, a ported cover, and valve guiding means at each side of said seat, of a thin valve member movable bodily towards and from said seat and guided during such movement by said guiding means, and a transversely flexed spring slidably guided by said guides and engaging said cover and valve to hold the latter normally in engagement with said seat.

39. In a valve mechanism, the combination with a valve cage having a plane seat traversed by an elongated port extending uninterruptedly throughout the major portion of the length of said seat, a ported cover having a rib superimposed over said port in said seat, and valve guiding means arranged at opposite sides of said port, of a thin, normally plane valve member movable bodily towards and from said seat and guided at its lateral edges by said guiding means during such movements, and a spring flexed about an axis which is parallel to the plane of said seat and extends transversely thereof in spaced relation thereto, said spring being guided by said guides and engaging said valve and rib in spaced parallel lines.

40. In a valve mechanism, the combination with a valve cage having a plane seat traversed by a port extending throughout the major portion of the length of said seat, a ported cover having a rib overlying said port, and valve guiding means arranged at opposite sides of said port, of a relatively thin plane valve member bodily movable towards and from said seat to control the port therein, said valve member being guided at its lateral edges by said guiding means, and a spring of a contour substantially like that of said valve and bowed about an axis which is spaced from said valve seat and whose projection thereon would fall substantially midway of the length thereof and perpendicular to a line parallel to the longer dimension of said port, said spring being imperforate throughout its portion above said port and engaging said rib and valve member along parallel lines which move relatively to each other on opening of said valve and said spring being guided during movement by engagement of its lateral edges with said guiding means.

41. In a compressor valve mechanism for use with compressor cylinders, a valve cage providing a plane valve seating surface traversed by a plurality of parallel elongated ports each extending throughout the greater portion of the length of said surface in one direction, a cover superimposed over said surface and having a surface disposed opposite to but spaced from said first mentioned surface, said second mentioned surface being traversed by flow slots parallel to but laterally offset from said ports whereby a rib is provided opposite each of said ports, valve means cooperating with said ports and formed of relatively thin flat material, spring means of the same contour as said valve means, said spring means being bowed about an axis whose projection on said seating surface is perpendicular to the length of said ports and engaging said valve means and said cover along parallel lines which move relatively to each other as said valve means opens, and guiding means cooperating with the lateral edges of said valve means.

42. In a valve mechanism, the combination with a valve cage providing a plane seat having a continuous elongated port therein extending throughout the greater portion of the length of said seat in the direction of the port, and a ported cover, of a thin normally plane valve member disposed over said port and movable bodily toward and from said seat, and a single spring similar in contour to said valve member loosely interposed between said valve member and cover and overlying said port, said spring being imperforate as to its portion overlying said port and flexed about a transverse axis, the flattening of said spring permitting the full necessary bodily opening movement of the valve.

43. In a valve, a ported seat, a relatively straight elongated flexible valve member cooperating with said seat, a cover, guiding means for said valve extending between said cover and said seat, and a flexed spring plate member, said spring member being interposed between and contacting with said valve and cover and guided at its lateral edges by said valve guiding means, and having at all times at least lines of contact with said members, said lines of contact being mutually parallel and parallel to the axis of flexure of said spring, and said spring being of at least as strong cross section at its central portion as at any other portion wherein flexure occurs.

44. In a valve mechanism, the combination with a valve cage comprising a substantially plane seat having at least one elongated port therein, a ported cover, and valve guiding means at opposite sides of said port, of a thin valve member movable bodily towards and from said seat and guided during such movement by said guiding means, and a transversely flexed spring whose axis of flexure is transverse to the major dimension of said port loosely interposed between said seat and cover and free from connection to the valve member and cover and positioned by said guiding means and engaging directly said cover and valve to hold the latter normally in engagement with said seat throughout its length.

45. In a valve mechanism for pumps, valve cage forming means providing a substantially plane valve seating surface, a substantially parallel abutment surface spaced from said valve seating surface, and guiding means providing guiding surfaces lying in planes at an angle to said surfaces, port means traversing said valve seating surface and comprising at least one port of materially greater length than width and having its central longitudinal line substantially straight, a valve member of relatively thin resilient material overlying said port means and when in seated position closing the latter but movable bodily away therefrom, means for normally holding said valve member seated constituted by a single spring disposed between said valve and said abutment surface and comprising a resilient transversely bowed element engaging said valve member and abutment surface directly and contacting with one of the same at loci so disposed that their projections on the valve seat fall adjacent the opposite ends of said port means and with the other of the same at a locus whose projection on the seat is between the ends of said port means, said valve member and spring having wholly imperforate portions extending throughout the full length of said port means and of greater width than the latter whereby they are unweakened, and being each adapted to be engaged and guided by said guiding means.

46. In a valve mechanism for pumps, valve cage forming means providing a substantially plane valve seating surface, a substantially parallel abutment surface spaced from said valve seating surface, and guiding means providing guiding surfaces lying in planes at an angle to said surfaces, port means traversing said valve seating surface and comprising at least one port of materially greater length than width and having its central longitudinal line substantially straight, said guiding means being disposed wholly to the sides of said port means, a valve member of relatively thin resilient material overlying said port means and when in seated position closing the latter but movable bodily away therefrom, means for normally holding said valve member seated constituted by a single spring of a contour substantially identical with said valve and disposed between the latter and said abutment surface and comprising a resilient transversely bowed element engaging said valve member and abutment surface directly and contacting with one of the same at loci so disposed that their projections on the valve seat fall adjacent the opposite ends of said port means and with the other of the same at a locus whose projection on the seat is between the ends of said port means, said valve member and spring having wholly imperforate portions extending throughout the full length of said port means and of greater width than the latter whereby they are unweakened, and being each adapted to be engaged and guided by said guiding means at portions wholly at the lateral edges thereof.

47. In a valve mechanism, the combination with a valve cage providing a plane seat having a continuous elongated port therein extending throughout the major portion of the length of said seat in the direction of said port and a cover having a rib overlying said port, of a thin normally plane valve member disposed over said port and movable as a whole from said seat to a position spaced therefrom when said valve is open, and a single spring whose projection on said valve member falls within the outlines of the latter, imperforate as to its portion overlying said port, and flexed about an axis whose projection on said seat extends transversely of said port about midway of its length, said spring engaging said valve and rib at all times along at least three spaced parallel lines disposed respectively one adjacent the center and the others adjacent the opposite ends of said port and flattening of said spring permitting the full necessary bodily opening movement of said valve, said cage also comprising guiding means engageable with the lateral edges of said valve and spring and maintaining the same opposite said port during opening and closing of said valve.

48. In a valve mechanism, a plane ported seat, a cover, a valve disposed between said seat and cover and adapted to close the ports in the former, and resilient spring means for effecting closing of said valve having free ends and a fixed portion intermediate said ends, said ends being each substantially parallel to the plane of said seat when said valve is closed, said spring means being flexible to bring said ends and said intermediate portion substantially into a single plane.

49. In a valve mechanism, a ported seat, a valve member cooperating with said seat, a guard member, and a flexed spring member whose projection on said valve would lie within the outlines of the latter and which contacts at all times with said valve and guard members along at least three parallel lines, the line of contact with one of said last mentioned members lying between lines of contact with the other of said last mentioned members and said valve spring member being of greater cross sectional area adjacent its single line of contact with the one of said members than adjacent either of its lines of contact with the other of said members.

50. In a valve, a ported seat member, a valve element cooperating with said seat member, a guard element, and a flexed spring plate member having at least three parallel lines of contact with said seat member and guard element and having a plurality of laterally spaced fingers engageable with one of said elements along a plurality of lines at each side of its line of engagement with the other element.

51. In a valve, a ported valve seat, a valve disposed over the ports thereof, a guard, and a transversely flexed spring having substantially the same contour as said valve disposed between said valve and guard, said spring having no portions whose projections on said seat fall outside the projection on the latter of said valve, and being unattached to said valve, and having when said valve is in a position intermediate its seated and its full open positions line contacts with said valve and with said guard.

In testimony whereof I affix my signature.

FRED D. HOLDSWORTH.

CERTIFICATE OF CORRECTION.

Patent No. 1,768,840. Granted July 1, 1930, to

FRED D. HOLDSWORTH.

It is hereby certified that error appears in the printed specification of the above numbered patent requiring correction as follows: Page 3, line 109, for the word "spacer" read spaced; page 4, line 94, claim 5, for "flexible" read flexed; page 8, line 107, claim 48, for "fixed" read flexed; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.